(12) United States Patent
Goldberg et al.

(10) Patent No.: US 10,373,495 B2
(45) Date of Patent: Aug. 6, 2019

(54) AUTONOMOUS VEHICLE PARKING USING VEHICLE USER INFORMATION

(71) Applicant: International Business Machines Corporation, Armonk, NY (US)

(72) Inventors: Itzhack Goldberg, Hadera (IL); Harry R. McGregor, Tucson, AZ (US); Christopher B. Moore, Vail, AZ (US); Jose R. Mosqueda Mejia, Puruandiro (MX); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 15/401,150

(22) Filed: Jan. 9, 2017

(65) Prior Publication Data

US 2018/0196429 A1     Jul. 12, 2018

(51) Int. Cl.
*G08G 1/14* (2006.01)
*B62D 15/02* (2006.01)
*G05D 1/00* (2006.01)

(52) U.S. Cl.
CPC ......... *G08G 1/147* (2013.01); *B62D 15/0285* (2013.01); *G05D 1/0011* (2013.01); *G08G 1/146* (2013.01); *G08G 1/148* (2013.01); *G05D 2201/0213* (2013.01)

(58) Field of Classification Search
CPC .............................. G05D 1/0088; G05D 1/021
USPC ......................................................... 701/23
See application file for complete search history.

(56) References Cited

U.S. PATENT DOCUMENTS

| 8,063,797 | B1 | 11/2011 | Sonnabend et al. |
| 2015/0073645 | A1 | 3/2015 | Davidsson et al. |
| 2015/0241241 | A1 | 8/2015 | Cudak et al. |
| 2015/0338852 | A1* | 11/2015 | Ramanujam ........... G01C 21/26 701/2 |
| 2015/0339928 | A1* | 11/2015 | Ramanujam ........... G08G 1/202 701/23 |
| 2015/0346727 | A1* | 12/2015 | Ramanujam ....... B62D 15/0285 701/23 |
| 2015/0348112 | A1* | 12/2015 | Ramanujam ....... G06Q 30/0266 705/14.63 |
| 2015/0348335 | A1* | 12/2015 | Ramanujam ........... G07C 5/006 701/23 |
| 2016/0180712 | A1 | 6/2016 | Rosen et al. |

(Continued)

OTHER PUBLICATIONS

Goldberg et al., "Autonomous Vehicle Parking Using Vehicle User Information", U.S. Appl. No. 15/716,553, filed Sep. 27, 2017, 25 pages.

(Continued)

*Primary Examiner* — Muhammad Shafi
(74) *Attorney, Agent, or Firm* — Stephanie L. Carusillo

(57) ABSTRACT

In an approach, a processor receives a notification that an autonomous vehicle is parked at a first location within a parking area, wherein the autonomous vehicle is associated with a user. A processor receives a first set of information, wherein the first set of information comprises a first expected location of the user prior to returning to the parking area. A processor determines a second location to park the autonomous vehicle based on the first set of information. A processor causes the autonomous vehicle to move to the second location.

17 Claims, 4 Drawing Sheets

(56) References Cited

U.S. PATENT DOCUMENTS

2017/0219362 A1    8/2017   Bryson et al.

OTHER PUBLICATIONS

IBM "List of Patent Applications Treated As Related", Appendix P, Dated Sep. 27, 2017, 2 pages.

Chinrungrueng et al., "Smart Parking: An Application Of Optical Wireless Sensor Network", Proceedings of the 2007 International Symposium on Applications and the Internet Workshops (SAINTW'07), Jan. 15-19, 2007, 4 pages, © 2007 IEEE.

Pinto, Sonia Preeti, "A Reservation Based Parking Lot System To Maximize Occupancy And Revenue", A thesis submitted to the Graduate School—New Brunswick, Rutgers, The State University of New Jersey, in partial fulfillment of the requirements for the degree of Master of Science, Graduate Program in Electrical & Computer Engineering, Oct. 2011, 103 pages, © 2011 Sonia Pinto.

Rao, Arjun, "Improving Parking Garage Efficiency Using Reservation Optimization Techniques", A thesis submitted to the Graduate School—New Brunswick, Rutgers, The State University of New Jersey, in partial fulfillment of the requirements for the degree of Master of Science, Graduate Program in Electrical & Computer Engineering, Oct. 2011, 159 pages, © 2011 Arjun Rao.

Rico et al., "Parking easier by using context information of a Smart City", Enabling fast search and management of parking resources, 2013 27th International Conference on Advanced Information Networking and Applications Workshops, Mar. 25-28, 2013, pp. 1380-1385, DOI 10.1109/WAINA.2013.150, © 2013 IEEE.

* cited by examiner

AUTONOMOUS VEHICLE PARKING USING VEHICLE USER INFORMATION

BACKGROUND

The present invention relates generally to the field of autonomous vehicle parking, and more particularly to autonomous vehicle parking based on a vehicle user's information.

An autonomous vehicle is a vehicle that is capable of sensing its environment and navigating without human input. An autonomous vehicle can also be known as a driverless car, self-driving car, or robotic car. Autonomous vehicles can detect surroundings using a variety of techniques such as radar, LIDAR, GPS, odometry, and computer vision. Advanced control systems interpret sensory information to identify appropriate navigation paths, as well as obstacles and relevant signage.

Parking areas are areas designed for vehicle parking that can be multi-story parking garages or large flat parking lots. Parking areas can have multiple vehicle entrances and exits. Parking areas can also have multiple entrances and exits for vehicle users to use to leave the parking area and to return to where they parked their vehicle. Parking areas can be first come, first serve for parking spots; can have designated parking spots for different lengths of time; or can have priority parking spots costs more than parking spots farther away.

SUMMARY

Aspects of an embodiment of the present invention disclose a method, computer program product, and computer system for parking autonomous vehicles based on vehicle user information. A processor receives a notification that an autonomous vehicle is parked at a first location within a parking area, wherein the autonomous vehicle is associated with a user. A processor receives a first set of information, wherein the first set of information comprises a first expected location of the user prior to returning to the parking area. A processor determines a second location to park the autonomous vehicle based on the first set of information. A processor causes the autonomous vehicle to move to the second location.

DETAILED DESCRIPTION

Embodiments of the present invention recognize the common necessity of parking areas for a location expecting mass visitation. However, the implementation of parking areas hasn't been modernized or updated. There isn't any intelligence being applied to take into account how long vehicles will be parked there, where a vehicle user is going from the parking area, and where the vehicle user will return from. The optimal parking location when arriving, based upon entrance and availability, is quite likely not the optimal location for the car to be parked when returning and departing from the parking area. Thus, there is a need for an approach that more efficiently utilizes the space within a parking area and accurately predict where and when a vehicle user will return to the vehicle without any direct input from the user.

Embodiments of the present invention recognize that with the advent of autonomous vehicles, autonomous vehicles within a parking area can be instructed to move between high priority areas and less desirable areas depending on how busy the parking area is and how long the vehicle will remain in the parking area. Embodiments of the present invention provide multiple benefits to the owner of a parking area, including allowing for denser parking and fully utilizing less desirable parking spots, and to an autonomous vehicle's user using the parking area, including causing the autonomous vehicle to park in a location based on the user's estimated return time and return location. In this manner, as discussed in greater detail herein, embodiments of the present invention involve mining of parking area data, vehicle user profile information, and nearby destination data to accurately predict when and where an autonomous vehicle's user will return to the autonomous vehicle.

The present invention will now be described in detail with reference to the Figures.

Figure 1:
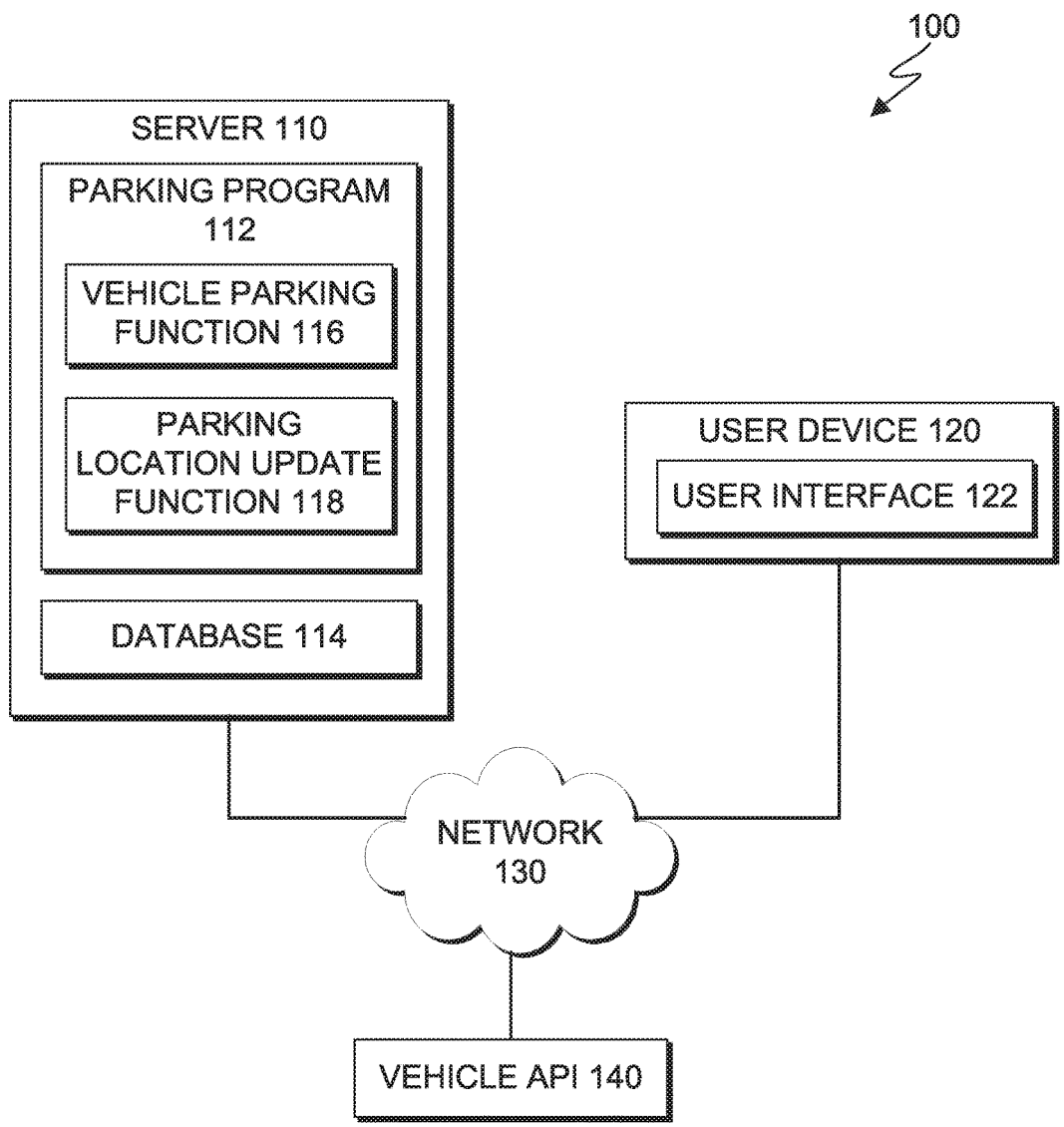
FIG. 1 is a functional block diagram illustrating a vehicle parking environment, in accordance with an embodiment of the present invention.

FIG. 1 depicts a diagram of vehicle parking environment 100, in accordance with an embodiment of the present invention. FIG. 1 provides only an illustration of one embodiment and does not imply any limitations with regard to the environments in which different embodiments may be implemented. In the depicted embodiment, vehicle parking environment 100 includes server 110, user device 120, and vehicle API 140, all interconnected over network 130. Vehicle parking environment 100 may include additional computing devices, servers, computers, mobile devices, or other devices not shown. Network 130 may be a local area network (LAN), a wide area network (WAN) such as the Internet, the public switched telephone network (PSTN), a mobile broadband network, such as a 4G and Long Term Evolution (LTE), any combination thereof, or any combination of connections and protocols that will support communications between server 110, user device 120, and vehicle API 140, in accordance with embodiments of the invention. Network 130 may include wired, wireless, or fiber optic connections.

Vehicle API 140 operates as an application program interface (API) for a vehicle that interfaces with parking program 112. In several embodiments, vehicle API 140 receives instructions from parking program 112 directing the vehicle to move to a new parking location. In an embodiment, vehicle API 140 receives turn by turn instructions to the new parking location. In another embodiment, vehicle API 140 receives geo-spatial positioning data of the new parking location and the vehicle determines the turn by turn movements. Geo-spatial positioning data may include, but is not limited to, GIS data, GPS data, and remote sensing.

Server 110 operates to run parking program 112 and database 114. In an embodiment, server 110 may be a management server, an internet server, or any other electronic device or computing system capable of running a program and receiving and sending data. In other embodiments, server 110 may represent a server computing system utilizing multiple computers as a server system, such as in a cloud computing environment. In some embodiments, server 110 may be a laptop computer, tablet computer, netbook computer, personal computer (PC), a desktop computer, a smart phone, or any programmable electronic device. In the depicted embodiment, server 110 contains parking program 112 and database 114. Server 110 may include components as depicted and described in further detail with respect to FIG. 4.

Parking program 112 operates to run vehicle parking function 116 and parking location update function 118. In an embodiment, parking program 112 mines vehicle user profile information for relevant information relating to when and where the vehicle user may return to the vehicle. Vehicle user profile information includes, but is not limited to, information that a user includes in a user profile or gives parking program 112 access to through user interface 122. In an embodiment, vehicle user profile information includes access to a user's geo-spatial position, a user's email accounts, a user's calendar events, and a user's social network activity, in which social network activity includes the user's posts and posts about the user, for example, by a friend or connection of the user. In an embodiment, parking program 112 has access to database 114 to retrieve parking area data and nearby destination data. In the depicted embodiment, parking program 112 resides on server 110. In another embodiment, parking program 112 may reside elsewhere within vehicle parking environment 100 provided parking program 112 has access to database 114.

Vehicle parking function 116 operates to determine where a vehicle, which a vehicle's user has dropped off in a parking area, should be parked based on parking area data, vehicle user profile information, and nearby destination data. In an embodiment, vehicle parking function 116 has access to database 114 for parking area data and nearby destination data. In an embodiment, vehicle parking function 116 receives a notification that a user of a vehicle has dropped the vehicle off in a designated drop off area of a parking area. In an embodiment, vehicle parking function 116 calculates an estimated time of return and return location of the vehicle's user and determines whether the vehicle should park in a temporary location or a final location. In one embodiment, vehicle parking function 116 determines whether the vehicle should park in a temporary location based on a usage threshold of the parking area. In one embodiment, vehicle parking function 116 sends an instruction to vehicle API 140 instructing the vehicle to move to a temporary parking location. For example, when a parking area has high traffic of vehicles coming and going and a usage threshold has been reached, vehicle parking function 116 sends an instruction to the vehicle to move to a temporary parking location that is in a less desirable location farther away from vehicle and user entrances and exits. In another example, when the vehicle user profile information indicates that the user will be gone from the vehicle for an extended period of time, vehicle parking function 116 sends an instruction to the vehicle to move to a temporary parking location that is in a less desirable location farther away from vehicle and user entrances and exits. In an embodiment, vehicle parking function 116 sends an instruction to vehicle API 140 instructing the vehicle to move to a final parking location, based on the estimated return location of the vehicle's user. In one example, where it was determined that the vehicle did not need to go to a temporary parking location, vehicle parking function 116 sends an instruction to the vehicle to move from the initial drop off location to a final parking location. In another example, where a vehicle is in a temporary parking location, at a predetermined amount of time before the calculated return time of the vehicle user, vehicle parking function 116 sends an instruction to the vehicle to move to a final parking location. In another example, where a vehicle is in a temporary parking location, at a predetermined amount of time before the calculated return time of the vehicle user, vehicle parking function 116 sends an instruction to the vehicle to return to the initial drop off location. Vehicle parking function 116 is described in further detail with respect to FIG. 2.

Parking location update function 118 operates to monitor vehicle user profile information to determine if a vehicle's parking location needs to be updated. In an embodiment, parking location update function 118 has access to database 114 for parking area data and nearby destination data. In an embodiment, parking location update function 118 monitors vehicle user profile information. In an embodiment, parking location update function 118 detects a change in user return time and return location. In an embodiment, parking location update function 118 calculates an updated user time of return and return location. In an embodiment, parking location update function 118 determines, based on the updated time of return and return location and a usage threshold of the parking area, whether the vehicle needs to be parked in a temporary location. In an embodiment, parking location update function 118 instructs the vehicle to park in a temporary location or a final location. Parking location update function 118 is described in further detail with respect to FIG. 3.

Database 114 is a repository for parking area data and nearby destination data. A database is an organized collection of data. Database 114 can be implemented with any type of storage device capable of storing data and configuration files that can be accessed and utilized by server 110, such as a database server, a hard disk drive, or a flash memory. Parking area data includes, but is not limited to, a general outline of the parking area, how many parking spots are available, where parking spots are available, and estimates of when parking spots will become available. A destination includes, but is not limited to, a restaurant, retail store, shopping mall, theme park, sporting arena, airport, and any establishment that utilizes the parking area. Nearby destination data includes, but is not limited to, restaurant reservation systems, operating hours of nearby destinations, and any other information provided by an establishment that utilizes the parking area. In an embodiment, database 114 is accessed by parking program 112 to store parking area data and nearby destination data. In another embodiment, database 114 is accessed to use parking area data and nearby destination data in the calculation of an estimated time of return and return location of the vehicle's user. In the depicted embodiment, database 114 resides on server 110. In another embodiment, database 114 may reside elsewhere within vehicle parking environment 100 provided parking program 112 has access to database 114.

User device 120 operates to run user interface 122. In some embodiments, user device 120 may be a laptop computer, tablet computer, netbook computer, personal computer (PC), a desktop computer, a smart phone, or any programmable electronic device. In the depicted embodiment, user device 120 contains user interface 122. User device 120 may include components as depicted and described in further detail with respect to FIG. 4.

User interface 122 operates as a local user interface on user device 120 of parking program 112 on server 110. In an embodiment, user interface 122 is a local mobile application user interface of parking program 112. In an embodiment, user interface 122 enables a user to create a profile linking a vehicle to the user and in which the user can allow parking program 112 access to user's social media accounts, emails, and calendar events to mine for vehicle user profile information. Vehicle user profile information includes, but is not limited to, information that a user includes in a user profile and information that the user gives parking program 112 access to through user interface 122 of parking program 112, such as the geo-spatial position of user device 120, email accounts, calendar events, and social network profiles and activity, in which social network activity includes the user's social network activity and other people's social network posts about the user.

Figure 2:
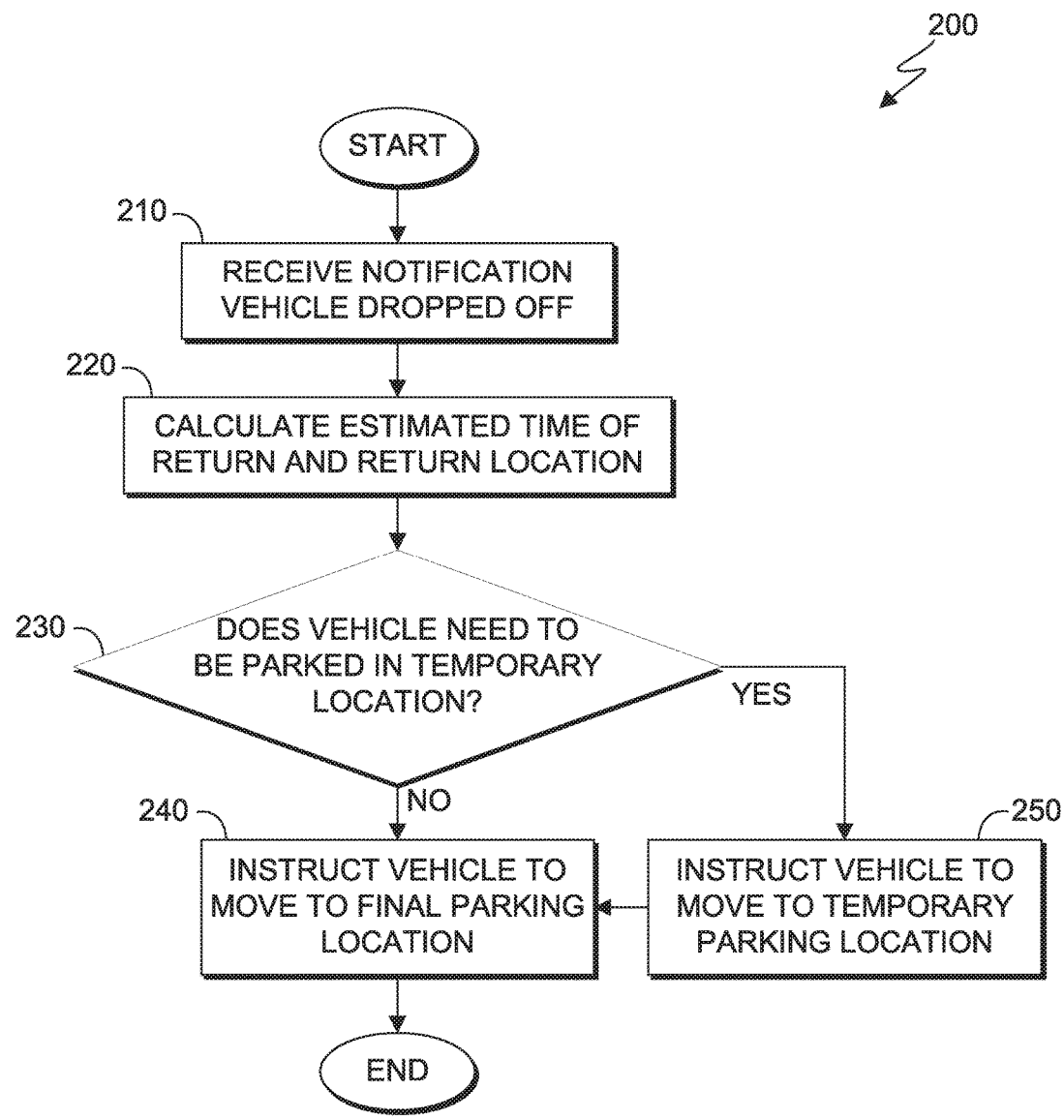
FIG. 2 is a flowchart depicting operational steps of a vehicle parking function of a parking program, on a server within the parking environment of FIG. 1, in accordance with an embodiment of the present invention.

FIG. 2 depicts a flowchart 200 of the steps of vehicle parking function 116 of parking program 112, executing within vehicle parking environment 100 of FIG. 1, in accordance with an embodiment of the present invention. In the depicted embodiment, vehicle parking function 116 operates to determine where a vehicle, which a vehicle's user has dropped off at a parking area, should be parked based on vehicle user profile information. It should be appreciated that the process depicted in FIG. 2 illustrates one possible iteration of vehicle parking function 116, which repeats for each time vehicle parking program 116 receives a notification that a vehicle has been dropped off in a parking area.

In step 210, vehicle parking function 116 receives a notification that a vehicle has been dropped off. In an embodiment, vehicle parking function 116 receives a notification from user interface 122 of parking program 112 that a user has dropped off a vehicle in a parking area drop off area. In an embodiment, user interface 122 enables a user to designate that a vehicle associated with vehicle user's profile on user interface 122 has been dropped off in a parking area.

In another embodiment, vehicle parking function 116 receives a notification from user interface 122 of parking program 112 that a user has parked their vehicle, which is associated with the user's profile in user interface 122, in a parking spot of the parking area. In this embodiment, with the notification, vehicle parking function 116 receives the location of the vehicle from vehicle API 140 or user interface 122.

In step 220, vehicle parking function 116 calculates an estimated time of return and return location of the vehicle's user. In an embodiment, vehicle parking function 116 mines vehicle user profile information for information relating to when and where a vehicle user may return to the vehicle. In an embodiment, vehicle parking function 116 calculates an estimated time of return and return location of the vehicle's user using the mined vehicle user profile information, and parking area data and nearby destination data retrieved from database 114. In an embodiment, vehicle parking function 116 accesses database 114 for parking area data and nearby destination data. In an embodiment, vehicle parking function 116 accesses vehicle user profile information directly from the social network application, email account application, and calendar account application on user device 120. For example, for a vehicle dropped off at a parking area near an airport, vehicle parking function 116 checks vehicle user profile information for calendar entries related to airline flights to determine a time of return for a user. In the same example, vehicle parking function 116 can also determine a return location based on which parking area entrance is closest to the terminal the user is flying into.

In decision 230, vehicle parking function 116 determines whether the vehicle needs to be parked in a temporary parking location. A temporary parking location can be a parking spot in a less desirable location farther away from parking area entrances and exits, and/or a section of the parking area that allows end-to-end parking where some vehicles are blocked in. In an embodiment, vehicle parking function 116 determines whether the vehicle needs to be parked in a temporary parking location based, at least in part, on a usage threshold of the parking area determined from parking area data from database 114 and the calculated estimated time of return and return location of the vehicle's user (step 220). In an embodiment, vehicle parking function 116 makes the determination of whether to park the vehicle in a temporary parking location based, at least in part, on these factors: whether there is a lot of traffic entering and exiting the parking area, whether the parking area is at a high capacity, or whether the vehicle user profile information indicates that the vehicle user will not return to the vehicle for an extended period of time.

If in decision 230, vehicle parking function determines that the vehicle needs to be parked in a temporary location, then, vehicle parking function 116 instructs the vehicle to move to a temporary parking location (see step 250). If in decision 230, vehicle parking function 116 determines that the vehicle does not need to be parked in a temporary location, then, vehicle parking function 116 instructs the vehicle to move to a final parking location (see step 240).

In step 240, vehicle parking function 116 instructs vehicle to move to a final parking location. In an embodiment, vehicle parking function 116 sends an instruction to vehicle API 140 instructing the vehicle to move to a final parking location. For example, where it was determined that the vehicle did not need to go to a temporary parking location, vehicle parking function 116 sends an instruction to the vehicle to move from the initial drop off location to a final parking location. In another example, where a vehicle is in a temporary parking location, at a predetermined amount of time before the calculated return time of the vehicle user, vehicle parking function 116 sends an instruction to the vehicle to move to a final parking location.

In step 250, vehicle parking function 116 instructs vehicle to move to a temporary parking location. For example, when a parking area has high traffic of vehicles entering and exiting the parking area and the usage threshold has been reached, vehicle parking function 116 sends an instruction to the vehicle to move to a temporary parking location that is in a less desirable location farther away from vehicle and user entrances and exits, such as far away from parking area entrances and exits. In another example, when the vehicle user profile information indicates that the user will be gone from the vehicle for an extensive amount of time, vehicle parking function 116 sends an instruction to the vehicle to move to a temporary parking location that is in a less desirable location, for example, farther away from vehicle and user entrances and exits.

Figure 3:
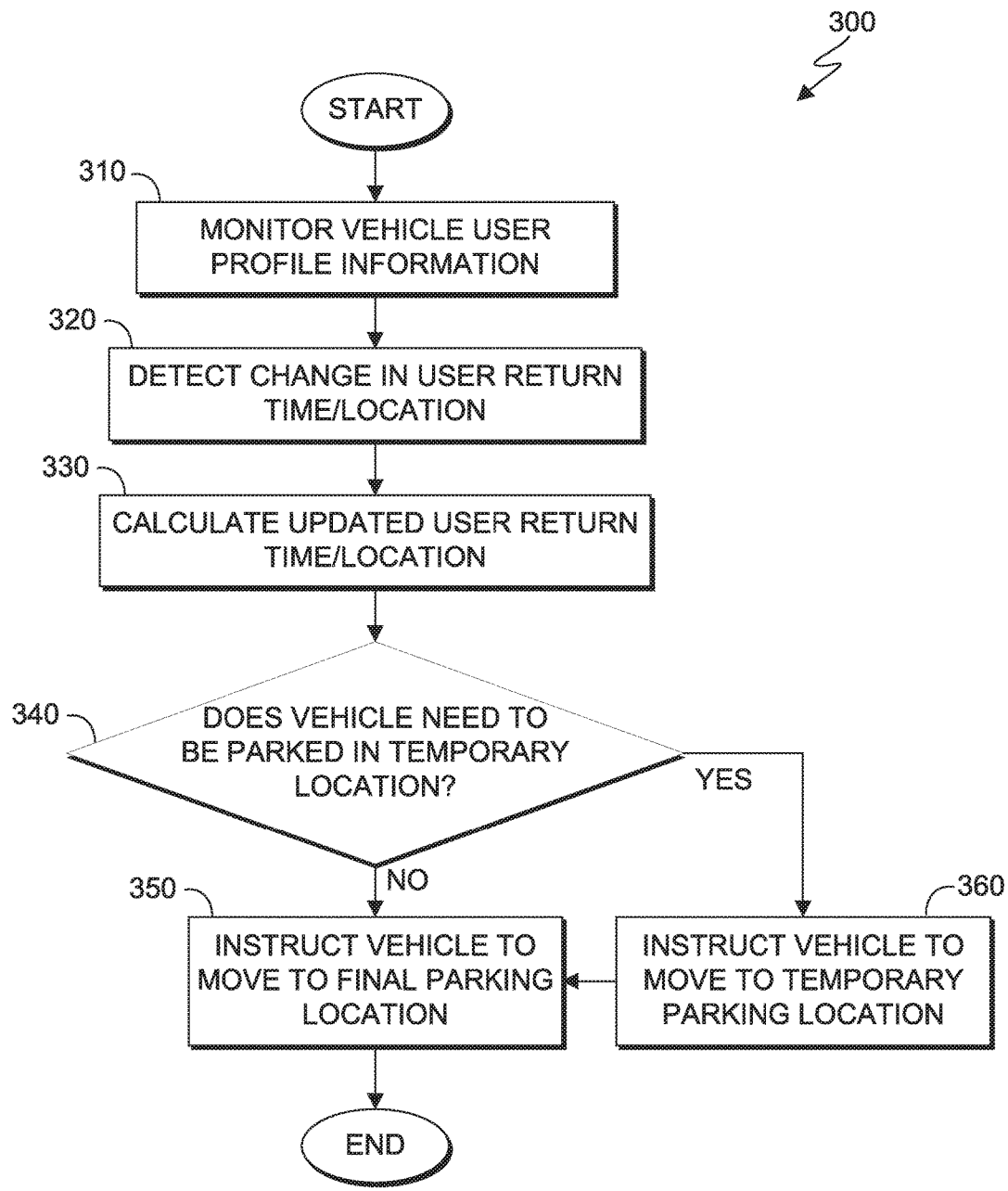
FIG. 3 is a flowchart depicting operational steps of a parking location update function of a parking program, on a server within the parking environment of FIG. 1, in accordance with an embodiment of the present invention.

FIG. 3 depicts a flowchart 300 of the steps of parking location update function 118 of parking program 112, executing within vehicle parking environment 100 of FIG. 1, in accordance with an embodiment of the present invention. In the depicted embodiment, parking location update function 118 operates to monitor vehicle users profile information to determine if a vehicle's parking location needs to be updated. It should be appreciated that the process depicted in FIG. 2 illustrates one possible iteration of parking location update function 118, which repeats for every time parking location update function 118 detects a change to the user return time and return location.

In step 310, parking location update function 118 monitors vehicle user profile information. In an embodiment, parking location update function 118 monitors vehicle user profile information accessed through the vehicle user's profile created on user interface 122, which is a local mobile application of parking program 112. Vehicle user profile information includes, but is not limited to, information that a user includes in a user profile or gives parking program 112 access to through user interface 122 of parking program 112, such as a user's geo-spatial position, a user's email accounts, a user's calendar events, and a user's social network activity, in which social network activity includes the user's posts and posts about the user, for example, by a friend or connection of the user.

In step 320, parking location update function 118 detects a change in estimated return time and return location. For example, parking location update function 118 detects that the user's geo-spatial position is moving towards the parking area earlier than calculated in step 220. In another example, where the parking area is next to an airport, parking location update function 118 detects that the user has received an email with a later flight return time. In another example, where the parking area is next to a shopping mall, parking location update function 118 detects by the user's geo-spatial position that the user is exiting the mall in a different location that calculated in step 220.

In step 330, parking location update function 118 calculates an updated user return time and return location. In an embodiment, parking location update function 118 calculates an updated user return time/location based on the detected change (step 320). In several embodiments, parking location update function 118 calculates a later user return time, an earlier user return time, and/or a different user return location.

In decision 340, parking location update function 118 determines whether the vehicle needs to be parked in a temporary parking location. A temporary parking location can be a parking spot in a less desirable location farther away from parking area entrances and exits, and/or a section of the parking area that allows end-to-end parking where some vehicles are blocked in. In an embodiment, parking location update function 118 determines whether the vehicle needs to be parked in a temporary parking location based, at least in part, on a usage threshold of the parking area determined from parking area data from database 114 and the updated calculated time of return and return location of the vehicle's user (step 330). In an embodiment, parking location update function 118 makes the determination of whether to park the vehicle in a temporary parking location based, at least in part, on these factors: whether there is a lot of traffic entering and exiting the parking area, whether the parking area is at a high capacity, or whether the updated vehicle user profile information indicates that the vehicle user will not return to the vehicle for an extended period of time.

If in decision 340, parking location update function 118 determines that the vehicle needs to be parked in a temporary location, then, parking location update function 118 instructs the vehicle to move to a temporary parking location (see step 360). If in decision 330, parking location update function 118 determines that the vehicle does not need to be parked in a temporary location, then, parking location update function 118 instructs the vehicle to move to a final parking location (see step 350).

In step 350, parking location update function 118 instructs vehicle to move to a final parking location. In an embodiment, parking location update function 118 sends an instruction to vehicle API 140 instructing the vehicle to move to a final parking location. For example, where it was determined that the vehicle did not need to go to a temporary parking location, parking location update function 118 sends an instruction to the vehicle to move from the parking location before initial drop off location to a final parking location. In another example, where a vehicle is in a temporary parking location, at a predetermined amount of time before the calculated return time of the vehicle user, parking location update function 118 sends an instruction to the vehicle to move to a final parking location.

In step 360, parking location update function 118 instructs vehicle to move to a temporary parking location. For example, when a parking area has high traffic of vehicles entering and exiting and the usage threshold has been met, parking location update function 118 sends an instruction to the vehicle to move to a temporary parking location that is in a less desirable location farther away from vehicle and user entrances and exits. In another example, when the vehicle user profile information indicates that the user will be gone from the vehicle for an extensive amount of time, parking location update function 118 sends an instruction to the vehicle to move to a temporary parking location that is in a less desirable location, for example, farther away from vehicle and user entrances and exits.

Figure 4:
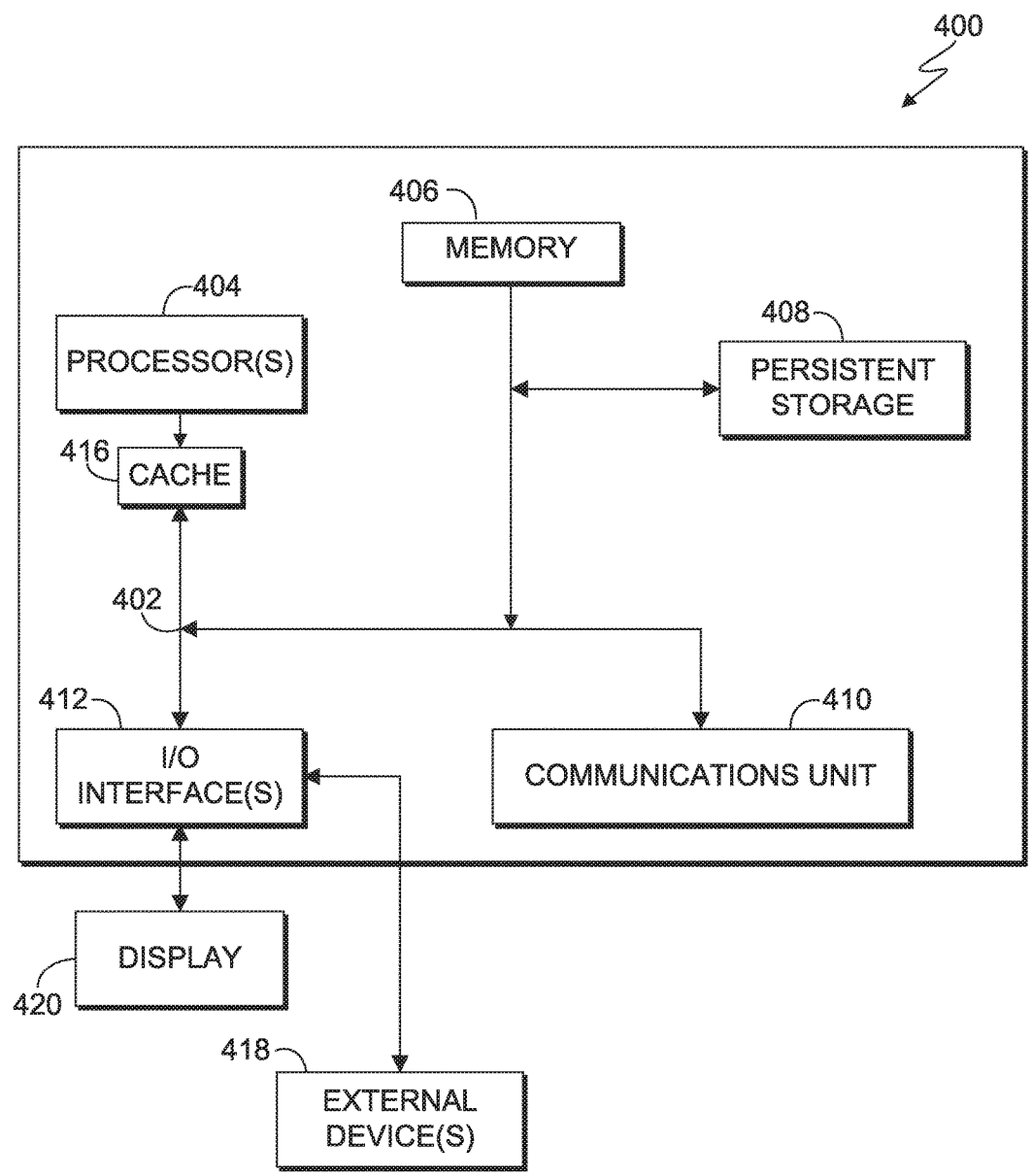
FIG. 4 depicts a block diagram of components of the server executing the parking program, in accordance with an embodiment of the present invention.

FIG. 4 is a block diagram depicting components of a computer 400 suitable for executing vehicle parking function 116 and parking location update function 118 of parking program 112. FIG. 4 displays the computer 400, the one or more processor(s) 404 (including one or more computer processors), the communications fabric 402, the memory 406, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for parking program 112 may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. Parking program 112 may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), a mobile broadband network, such as a 4G and Long Term Evolution (LTE), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more processors, a notification that an autonomous vehicle is parked at a first location within a parking area, wherein the autonomous vehicle is associated with a user and a user profile;
   calculating, by one or more processors, a first return time of the user to the parking area and a first return location of the user based on at least one of a first set of information from the user profile, information associated with the parking area, and information provided by an establishment that utilizes the parking area;
   determining, by one or more processors, a second location to park the autonomous vehicle based on the first return time of the user, the first return location of the user, and a usage threshold of the parking area, wherein the usage threshold is based on a level of traffic entering and exiting the parking area at vehicle and user entrances and exits; and
   causing, by one or more processors, the autonomous vehicle to move to the second location.

2. The method of claim 1, wherein the first set of information from the user profile includes information retrieved from at least one social media account of the user.

3. The method of claim 1, further comprising:
   identifying, by one or more processors, that the usage threshold of parking area has been exceeded;
   determining, by one or more processors, a third location to park the autonomous vehicle that is farther away from vehicle and user entrances and exits of the parking area than the second location; and
   prior to causing the autonomous vehicle to move to the second location, causing, by one or more processors, the autonomous vehicle to move to the third location.

4. The method of claim 1, further comprising:
   receiving, by one or more processors, a second set of information from the user profile, wherein the second set of information comprises a second return location of the user;
   determining, by one or more processors, a third location to park the autonomous vehicle based on the second set of information; and
   causing, by one or more processors, the autonomous vehicle to move to the third location.

5. The method of claim 1, further comprising:
   receiving, by one or more processors, a second set of information from the user profile, wherein the second set of information comprises a second return location of the user;
   calculating, by one or more processors, a second return time of the user to the parking area based, at least in part, on the second set of information;
   determining, by one or more processors, a second time to park the autonomous vehicle at a third location based on the second set of information;
   determining, by one or more processors, the third location to park the autonomous vehicle based on the second set of information; and
   causing, by one or more processors, the autonomous vehicle to move to the third location at the second time.

6. The method of claim 1, further comprising:
   determining, by one or more processors, that the user is going to return to the parking area after a period of time;
   determining, by one or more processors, a third location to park the autonomous vehicle based on the first set of information and the period of time, wherein the third location experiences lower traffic than the second location; and
   prior to causing the autonomous vehicle to move to the second location, causing, by one or more processors, the autonomous vehicle to move to the third location.

7. A computer program product comprising:
   one or more computer readable storage media and program instructions stored on the one or more computer readable storage media, the program instructions comprising:
   program instructions to receive a notification that an autonomous vehicle is parked at a first location within a parking area, wherein the autonomous vehicle is associated with a user and a user profile;
   program instructions to calculate a first return time of the user to the parking area and a first return location of the user based on at least one of a first set of information from the user profile, information associated with the parking area, and information provided by an establishment that utilizes the parking area;

program instructions to determine a second location to park the autonomous vehicle based on the first return time of the user, the first return location of the user, and a usage threshold of the parking area, wherein the usage threshold is based on a level of traffic entering and exiting the parking area at vehicle and user entrances and exits; and program instructions to cause the autonomous vehicle to move to the second location.

8. The computer program product of claim 7, wherein the first set of information from the user profile includes information retrieved from at least one social media account of the user.

9. The computer program product of claim 7, further comprising:

program instructions to identify that the usage threshold of parking area has been exceeded;

program instructions to determine a third location to park the autonomous vehicle that is farther away from vehicle and user entrances and exits of the parking area than the second location; and prior to the program instructions to cause the autonomous vehicle to move to the second location, program instructions to cause the autonomous vehicle to move to the third location.

10. The computer program product of claim 7, further comprising:

program instructions to receive a second set of information from the user profile, wherein the second set of information comprises a second return location of the user;

program instructions to determine a third location to park the autonomous vehicle based on the second set of information; and program instructions to cause the autonomous vehicle to move to the third location.

11. The computer program product of claim 7, further comprising:

program instructions to receive a second set of information from the user profile, wherein the second set of information comprises a second return location of the user;

program instructions to calculate a second return time of the user to the parking area based, at least in part, on the second set of information;

program instructions to determine a second time to park the autonomous vehicle at a third location based on the second set of information;

program instructions to determine the third location to park the autonomous vehicle based on the second set of information; and program instructions to cause the autonomous vehicle to move to the third location at the second time.

12. The computer program product of claim 7, further comprising:

program instructions to determine that the user is going to return to the parking area after a period of time;

program instructions to determine a third location to park the autonomous vehicle based on the first set of information and the period of time, wherein the third location experiences lower traffic than the second location; and prior to the program instructions to cause the autonomous vehicle to move to the second location, program instructions to cause the autonomous vehicle to move to the third location.

13. A computer system comprising:

one or more computer processors;

one or more computer readable storage media;

program instructions stored on the computer readable storage media for execution by at least one of the one or more processors, the program instructions comprising:

program instructions to receive a notification that an autonomous vehicle is parked at a first location within a parking area, wherein the autonomous vehicle is associated with a user and a user profile;

program instructions to calculate a first return time of the user to the parking area and a first return location of the user based on at least one of a first set of information from the user profile, information associated with the parking area, and information provided by an establishment that utilizes the parking area;

program instructions to determine a second location to park the autonomous vehicle based on the first return time of the user, the first return location of the user, and a usage threshold of the parking area, wherein the usage threshold is based on a level of traffic entering and exiting the parking area at vehicle and user entrances and exits; and program instructions to cause the autonomous vehicle to move to the second location.

14. The computer system of claim 13, wherein the first set of information from the user profile includes information retrieved from at least one social media account of the user.

15. The computer system of claim 13, further comprising:

program instructions to identify that the usage threshold of parking area has been exceeded;

program instructions to determine a third location to park the autonomous vehicle that is farther away from vehicle and user entrances and exits of the parking area than the second location; and prior to the program instructions to cause the autonomous vehicle to move to the second location, program instructions to cause the autonomous vehicle to move to the third location.

16. The computer system of claim 13, further comprising:

program instructions to receive a second set of information from the user profile, wherein the second set of information comprises a second return location of the user;

program instructions to determine a third location to park the autonomous vehicle based on the second set of information; and program instructions to cause the autonomous vehicle to move to the third location.

17. The computer system of claim 13, further comprising:

program instructions to receive a second set of information from the user profile, wherein the second set of information comprises a second return location of the user;

program instructions to calculate a second return time of the user to the parking area based, at least in part, on the second set of information;

program instructions to determine a second time to park the autonomous vehicle at a third location based on the second set of information;

program instructions to determine the third location to park the autonomous vehicle based on the second set of information; and program instructions to cause the autonomous vehicle to move to the third location at the second time.

* * * * *